J. L. CREVELING.
ELECTRIC REGULATION.
APPLICATION FILED JAN. 16, 1912.
1,239,772.
Patented Sept. 11, 1917.
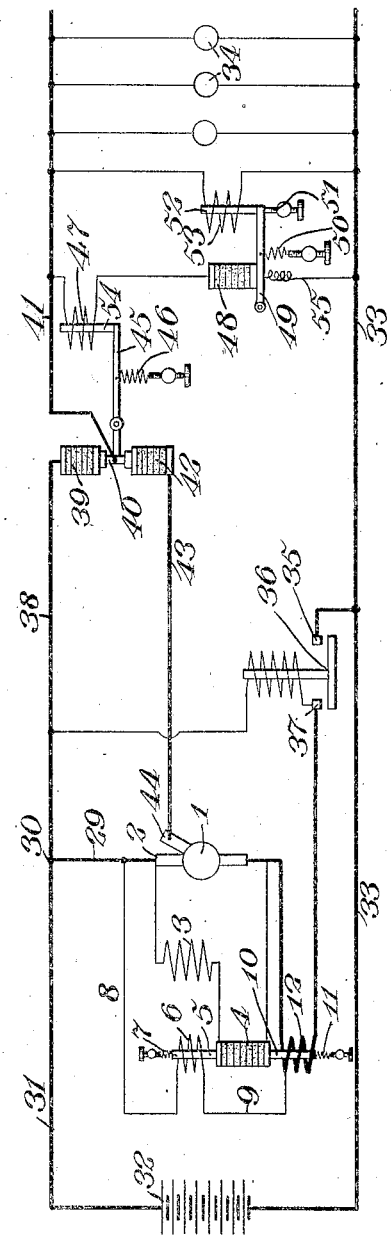
WITNESSES
H. Crocheron
Anna M. Wall
INVENTOR
John L. Creveling

UNITED STATES PATENT OFFICE.

JOHN L. CREVELING, OF NEW YORK, N. Y., ASSIGNOR TO SAFETY CAR HEATING AND LIGHTING COMPANY, A CORPORATION OF NEW JERSEY.

ELECTRIC REGULATION.

1,239,772.  Specification of Letters Patent.  Patented Sept. 11, 1917.

Original application filed November 5, 1910, Serial No. 590,835. Divided and this application filed January 16, 1912. Serial No. 671,418.

*To all whom it may concern:*

Be it known that I, JOHN L. CREVELING, a resident of New York, in the county and State of New York, have invented certain new and useful Improvements in Electric Regulation, as set forth in the annexed specification and drawing forming a part thereof.

My invention pertains to that class of electric regulation wherein it is desired to regulate an electric circuit in a predetermined manner.

My invention has for its particular object to provide means whereby the voltage impressed upon a translating circuit may be held constant through changes in voltage at the source from which said circuit is fed.

This application is a division of my application, Serial No. 590,835 for improvement in electric regulation, filed November 5, 1910.

As my invention is particularly applicable to that class of systems wherein a generator is used to charge a storage battery and operate lamps or other translating devices, it will be described with reference to such a system.

The drawing is a diagrammatic representation of one type of such system employing my invention.

In the drawing, 1 represents a dynamo or generator, the main positive brush of which is indicated at 2. 3 represents the usual field winding which is shown as having in series therewith a variable resistance 4 indicated as a carbon pile, the operation of which is well known in the art. 5 is an iron core surrounded by the solenoid 6 and normally pressed in such direction as to compact the pile 4 and reduce its resistance as by means of adjustable spring 7. The coil 6, when energized, tends to move the core 5 against the action of spring 7 and increase the resistance 4 and prevent the generator voltage from exceeding a certain predetermined amount, which may be adjusted as by means of spring 7, inasmuch as the coil 6 is in shunt across the generator as indicated by means of wires 8 and 9. 10 represents a similar core normally pressed as by adjustable spring 11 in such direction as to tend to compact the pile 4 and decrease the resistance thereof. The coil 12, surrounding core 10, when energized, tends to move the same against the action of spring 11 so as to decrease the pressure upon the carbon pile 4 and prevent the generator current output exceeding a certain predetermined limit, adjustable as by spring 11 inasmuch as the said winding 12 is in series with the generator. The generator is shown automatically regulated in such manner that its current output and voltage cannot exceed certain predetermined limits.

In the drawing, the positive generator lead 29 is shown as carried from the positive brush 2 to the junction point 30 from whence the wire 31 is carried to the positive side of the storage battery 32, the negative side of which is connected to the wire 33 in communication with the negative side of the lamps or other translating devices 34 and one terminal 35 of the automatic switch 36. The opposite terminal 37 of the said switch is connected through the coil 12 as indicated with the negative brush of the generator 1. From the junction point 30, the wire 38 is carried to one end of the carbon pile 39, the opposite end of which is in electrical communication with movable member 40, communicating with the wire 41, which is carried to the positive side of the translating devices 34. The member 40 is in electric communication with one end of the carbon pile 42, the opposite end of which is connected as by wire 43 with the auxiliary brush 44 of the generator 1. The member 40 is carried by the pivoted lever 45 normally drawn in such direction by spring 46 as to tend to increase the pressure upon the pile 39 and decrease the pressure upon the pile 42. The lever 45 is provided with an iron core 54, surrounded by the solenoid 47 which, when energized, tends to lift the core in such manner as to decrease the pressure upon the pile 39 and increase the pressure on the pile 42. One end of the solenoid 47 is connected with the wire 41; the other end is carried to one end of the small carbon pile 48, the opposite end of which is in electrical communication with the lever 49 which is electrically connected as by wire 55 with the wire 33. The lever 49 is normally drawn downwardly by the adjustable spring 50 in such manner as to decrease the pressure upon the pile 48 and increase its resistance, while the limit of motion that can be caused by the spring 50 may be regulated by the adjustable screw 51. The lever 49 is provided with an iron core 52, surrounded by solenoid 53 in shunt across the translation circuit. Energization of the coil 53, tends to lift the core 52 in such manner as to compress the carbons 48 and lower the resistance thereof.

The operation of my invention is substantially as follows:—

If the dynamo be started, current will flow from the positive brush 2 through the field 3, carbon pile 4, and return to the generator and the field will build up in a well known manner. Current will also flow through wire 8, coil 6, wire 9, to the generator and I so adjust the spring 7 that when the maximum desired voltage is reached across the generator the pressure upon the pile 4 will be reduced and its resistance increased in such manner that this voltage will not be exceeded by the generator. If the generator voltage be brought up to that point at which the switch 36 be set to close and if this voltage be in excess of the voltage of the storage battery shown at 32, current will flow to the battery as will hereinafter be more fully explained. In practice, I find it advisable to so adjust the switch 36 that it will open and close at substantially the battery voltage and it is obvious that any preferred form of such switches may be employed which will perform this function. As many such switches are well known in the art and the particular type thereof forms no part of my present invention, I have shown an automatic switch operated by a simple shunt coil for the sake of simplicity merely to indicate that said switch is automatic and operated by difference of potential across the generator.

In the system shown in the drawing, if the translating devices 34 be in circuit current will flow from the junction point 30, through wire 38, carbon pile 39, member 40, wire 41, translating devices 34 to wire 33. Current will also tend to flow from the wire 41 through the coil 47, resistance 48, lever 49 and wire 55 to lead 33 and current will also flow through solenoid 53. If the voltage across the generator circuit be equal or below the normal voltage desired across the translating devices, I so adjust the spring 50 and the screw 51 that there will be very slight pressure upon the carbon pile 48 and the resistance of the said pile will be high, then the current in the winding 47 will be quite small and I adjust the spring 46 so that the maximum pressure is exerted upon the pile 39 which will then have its maximum resistance. Under these conditions the pile 42 will have its maximum resistance and the said pile is so arranged that under these conditions this resistance may, for all practical purposes, be considered as an open circuit. If now, the voltage across the generator circuit shall rise, the voltage across the translating devices will also tend to rise and the coil 53 and the mechanism operated thereby is so arranged that this rise above the normal will move the lever 49 against the action of the spring 50 and compress the pile 48 and reduce its resistance. This will increase the current in the coil 47, which in turn, will lift the lever 45 against the action of spring 46 and increase the resistance 39 in such manner as to hold the voltage on the translation circuit substantially constant. At a proper point in the motion of the lever 45, the resistance of the pile 42 will be greatly reduced and may be considered almost negligible under certain conditions at which time, the resistance of 39 will be considerable and very little current will flow therethrough. At this time most of the current supplied to the translating devices will flow from the auxiliary brush 44, through wire 43, carbon pile 42, member 40 and wire 41 and as this current is tapped from a brush upon the commutator at a point of lower voltage than the main positive brush, and the voltage of which may be readily adjusted by selecting the proper position of the brush 44, the lamps or other translating devices may be fed at a considerably lower voltage than that necessary to charge the battery without having in series therewith a resistance of such value as will cause appreciable loss or trouble in the manner of the dissipation of heat. If now, the voltage across the translating devices shall fall, a cycle the reverse of the above outlined will be gone through and the translation circuit main 41 will be in effect, gradually shifted from connection with the brush 44 to connection with the brush 2 in an obvious manner.

From the foregoing, it will be plain that I have produced a means for holding the voltage upon a translation circuit substantially constant throughout the rise necessary to charge a storage battery which may be charged from a generator supplying also the said translation circuit without making such regulation wholly dependent upon the dissipation of the energy due to the difference of potential of the respective circuits in the form of heat. Thus I have produced a simple and more efficient system for this purpose.

I do not wish in any way to limit myself to the details shown in the accompanying drawing, which is a mere diagrammatic representation of one type of system embodying my invention, for it is obvious that wide departure may be made therein without departing from the spirit and scope of my invention, which is as set forth in the following claims:

1. The combination with a generator and means for delivering therefrom currents at different voltages, a storage battery in connection with said means adapted to be charged thereby, a translation circuit connected to said storage battery and said means through a variable resistance, a second variable resistance connecting said translation circuit with one of said current delivering means of said generator at a voltage less than that supplied to said battery, and means responsive to voltage fluctuations in the translation circuit to determine through which of said two resistances said translation circuit is to be supplied and to control the value of said selected resistance to maintain constant voltage on said translation circuit.

2. The combination with a generator and means for taking therefrom currents at different voltages, a storage battery in connection with said means, means for charging said storage battery from said generator, a translation circuit, and a variable resistance connecting the same with the storage battery, a variable resistance for connecting the translation circuit with one of the current collecting means of said generator at a voltage less than that supplied to the battery, and means for controlling said resistances.

3. The combination with a generator and means for taking therefrom currents at different voltages, a storage battery in connection with said means, a translation circuit and a variable resistance connecting the same with the storage battery, a variable resistance for connecting the translation circuit with one of the current collecting means of said generator at a voltage less than that supplied to the battery, and means for controlling said resistances responsive to fluctuations in the translation circuit.

4. In combination with a generator having a plurality of means for delivering current at different voltages; a battery and a translation circuit for receiving current from one of said delivering means; and means for automatically connecting the said translation circuit with another of said delivery means.

5. In combination with a generator having a plurality of means for delivering current at different voltages: a battery and a translation circuit for receiving current from one of said delivering means; and means for automatically connecting the translation circuit with another of said delivery means, without disturbing the connection of the battery with said first delivery means.

6. In combination with a generator and a plurality of means enabling the same to deliver current at different voltages; a battery and a translation circuit; connections from one of the delivery means to the battery and translation circuit; connections from another delivery means to the translation circuit; and means, controlled by conditions in the translation circuit, for determining which of said delivery means shall supply said translation circuit.

7. In combination with a generator and a plurality of means enabling the generator to deliver current at different voltages; a battery and a translation circuit; a resistance in circuit with one of said means; a resistance in circuit with another of the delivery means; means capable of connecting with either of said resistances to control its value; and means for actuating the connecting means to cause it to operate upon either resistance according to conditions in the translation circuit.

8. In combination with a generator and a plurality of means enabling the generator to deliver current at different voltages; a battery and a translation circuit; a resistance in circuit with one of said means; a resistance in circuit with another of the delivery means; means capable of connecting with either of said resistances to control its value; means for actuating the connecting means to cause it to operate upon either resistance according to conditions in the translation circuit; and a translation circuit regulator and connections to the actuating means for influencing the actions of the latter upon the connecting means.

JOHN L. CREVELING.

Witnesses:
ANNA M. WALL,
M. HERSKOVITZ.